United States Patent [19]
Murton

[11] 3,897,256
[45] July 29, 1975

[54] REFRACTORY LINING MIXTURE FOR HOT METALLURGICAL VESSELS

[76] Inventor: Crawford B. Murton, 1906 Brushcliff Rd., Pittsburgh, Pa. 15221

[22] Filed: Jan. 4, 1973

[21] Appl. No.: 320,894

Related U.S. Application Data

[60] Continuation-in-part of Ser. No. 320,893, Jan. 4, 1973, which is a division of Ser. No. 77,059, Oct. 1, 1970, Pat. No. 3,737,489.

[52] U.S. Cl.................................. 106/68; 106/84
[51] Int. Cl............................................. C04b 35/14
[58] Field of Search ............... 106/68, 69, 84, 65

[56] References Cited
UNITED STATES PATENTS

| | | | |
|---|---|---|---|
| 3,026,212 | 3/1962 | Fay et al. | 106/68 |
| 3,193,402 | 7/1965 | Rusoff et al. | 106/84 |

*Primary Examiner*—J. Poer

[57] ABSTRACT

A method for relining metallurgical ladles, soaking pits, and furnaces at temperatures of at least about 250°F by applying a mixture of refractory materials against a prior-existing lining without prior cooling thereof, the relining thickness being at least one-fourth inch. The dry refractory mixture consists essentially of, by weight, from about ½% to about 4% of sodium silicate, from about ½% to about 4% of an organic binder, from about 20% to 80% of clay, and from about 12% to about 72% quartzite. To facilitate its application, the dry refractory mixture may be mixed with about 4% to 6% water as it is applied.

8 Claims, 2 Drawing Figures

PATENTED JUL 29 1975　　3,897,256

REFRACTORY LINING MIXTURE FOR HOT METALLURGICAL VESSELS

CROSS REFERENCE TO RELATED APPLICATIONS

This application is a continuation-in-part of an application Ser. No. 320,893, filed Jan. 4, 1973, which is a division of Ser. No. 77,059, filed Oct. 1, 1970, now U.S. Pat. No. 3,737,489.

BACKGROUND OF THE INVENTION

1. Field of the Invention

This invention relates to a method for relining metallurgical vessels such as ladles, furnaces, soaking pits, and the like, at elevated temperatures. The invention also pertains to a refractory composition for use as a liner at temperatures of from 250° to about 3,000°F.

2. Description of the Prior Art:

In the past refractory lining for hot metal furnaces and ladles have been constructed of refractory brick laid up with mortar. With repeated use, the lining eroded away until a thin remaining lining was replaced with a new lining or refractory brick laid up with mortar. Moreover, during the period of normal service life, certain areas of severe wear required patching by removing the affected areas and relaying new brick.

The successful use of the so-called "pneumatic gun" in the construction industry for the placement of concrete was soon followed by attempts to use the gun for the application of refractory walls and linings of metallurgical furnaces and ladles. Although those attempts provde successful for the application of refractory linings to cold proved and furnaces, most attempts to apply refractory linings to hot furnaces, such as at about 200°F. or more, have been unsuccessful. In metallurgical ladles, especially iron and steel ladles, attempts to reline them hot have been totally unsuccessful with prior used refractory compositions.

As a result the advantages of quickly applying a reliner by the use of a pneumatic gun in a relatively short time to hot ladles and furnaces have been defeated by the inability to make the lining without waiting for the walls to cool to at least below about 350°F. Accordingly, a furnace or ladle has been out of operation for long periods of time while cooling down to the necessary temperature for the replacement or repair of the lining.

Associated with the foregoing has been the problem of the application of conventional compositions for replacement linings. They simply have not been applicable to hot walls of metallurgical furnaces and ladles. One difficulty with conventional compositions has been the necessity of mixing large amounts of water with the conventional refractory materials for the primary purpose of cooling the interface between the old lining and the newly applied material to a temperature below which steam forms. As a matter of fact, conventional materials usually rely upon mechanical structures such as cracks or crevices in the old wall to support the reliner material. When applied to a smooth vertical wall, the adherence with the reliner is uncertain and usually subject to premature failure.

When conventional compositions of refractory linings are applied to cold surfaces, the lining must contain enough initial moisture to provide for coalescence of the composition as it travels from the impeller or gun to the wall and to provide for bonding of the components forming the lining after their placement. In general, the range of the water content of conventional mixtures is from about 10% to 20% by weight. In order to avoid steam explosions it has been necessary to carefully dry the newly applied liner before the furnace or ladle can be returned to service.

For example, it has been found that when a liner in a steel ladle having a thickness of from 4 to 6 inches is applied cold, a period of from 6 to 15 hours is necessary to reduce the mosiure content to an acceptable level to create sufficient bond strength to meet the loading requirements of the ferrostatic head. Similarly, in soaking pits and preheat furnaces, the heating times required are of the order of from 24 to 72 hours. Without those drying and heating programs the performance of the applied lining was uncertain.

Most of the commercially available refractory materials applied by pneumatic guns or impellers for relining purposes have contained high alumina cement or other bonding agents that provide room temperature structural strength. Most refractories placed as linings or furnace ladles and soaking pits as applied by so-called "gunning" or other techniques have been applied at low temperatures compared to the metallurgical furnace operating temperatures. Attempts to apply conventional refractory materials by pneumatic guns or centrifugal impellers at elevated temperatures have resulted in excessive rebound loss such as from 20% to 90% of the total material applied. As a result large quantities of refractory material are lost until the surface on which the material is applied is sufficiently cool to prevent steam formation and thus to permit a buildup to begin. The major prior use of mechanical or pneumatic means for the application of refractory linings has been for structures that have been precooled to room temperature in order to aovid the loss of most of the material applied and to avoid shrinkage defects.

A further problem with conventional methods of pneumatic or mechanical gunning has been the determination of how thick a relining has been applied. Those conversant with pneumatically placed refractory materials known that variation in thickness to ± 10% magnitude is the rule rather than the exception because the application is made normally and controlled visually. An exception to the preceding statement is the technique used in slingering ladles where a centrally located form is used to form an annular space between the ladle shell and the form.

However, a general statement can be made regarding all conventional systems, e.g., brick linings, cold pneumatically gunned linings, or mechanically slingered ladle repair or construction techniques. All rely upon the total consumption of the refractory lining and subsequent tearing out of the lining when it has eroded so thin that it is unsafe. In other words, the initial lining thickness must be so great that the capacity of the ladle is curtailed as compared to the optimum thickness of lining compatible with safety standards, heat balance, and maximization of ladle capacity. The curtailment in overall capacity can result in lost production ranging from 8% to 17%. This loss results from using a ladle until the lining has worn dangerously thin, tearing out the old lining, relining, and then drying for an extended period of time usually 15 hours. Capacity has been sacrificed to give a few extra charges. It is better to determine the optimum wall thickness and then repair the ladle cyclically and perpetually maintaining maximum charge weight and minimum down time for the ladle.

SUMMARY OF THE INVENTION

In accordance with this invention it has been found that the foregoing difficulties may be overcome by a method for applying a refractory mixture which method comprises the steps of holding a metallurgical vessel at a temperature of at least about 250°F., applying a refractory mixture to be deposited as a lining upon the walls of the furnace or ladle to a desired thickness, whereby maximum adherence is obtained through melting of the organic binder present in the refractory mixture and mositure removal is indicated by a change of color of the lining.

The invention also includes a mixture of refractory compositions for lining having a thickness of at least about one-fourth inch and which lining may be uniformly and consistently applied as a repair or replacement lining on an existing metallurgical furnace or ladle at temperature of at least about 250°F and which mixture having a particle size of about 8 mesh consists essentially of, by weight, from about ½% to about 4% sodium silicate, from about ½% to about 4% organic binders, from about 20% to about 80% of clay, from about 12% to 72% quartzite, and (in most cases) from about 4% to 6% of water.

The advantage of the composition of this invention is the reduction of the amount of material needed to provide an additional heat in steel ladle lining life from 0.9 tons to 0.7 tons — a reduction of 22%.

DESCRIPTION OF THE PREFERRED EMBODIMENT

After a heat of liquid metal is poured from a ladle, the ladle is normally inverted to pour out any remaining slag. Thereafter, the stopper rod and nozzle are removed and replaced. The ladle is then ready for reuse, after allowing sufficient time for a reset nozzle to dry out. When the ladle has been used a sufficient number of times, such as 15 to 20 heats, the lining is normally worn thin enough to require replacement. After 70% of the normal lining life has been used, the process of the present invention is employed to apply a replacement lining on the inner surface of the ladle.

The process of the present invention comprises the steps of:

1. holding a ladle to be relined at a temperature of at least 250°F;
2. applying a mixture of refractory material upon the inner surface of the ladle to the desired thickness; and
3. holding the ladle for a period of time sufficient to expel any included moisture, to allow the organic binder in the mixture to melt and carbonize.

Figure 1:
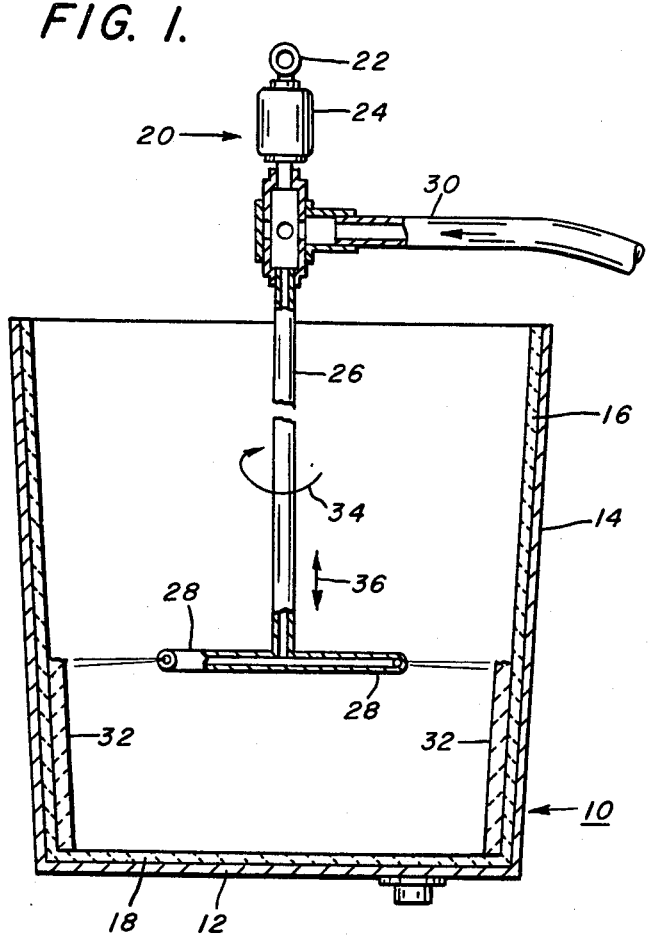

As shown in FIG. 1, for example, a ladle 10 is placed upright. The ladle 10 includes a bottom wall 12 and a circular side wall 14 which walls are normally composed of metal plates fabricated to the desired shape. The used ladle 10 also includes a remaining refractory lining 16 which is snugly disposed against the inner surface of the wall 14. The bottom wall 12 also includes a remaining refractory lining 18.

Figure 2:
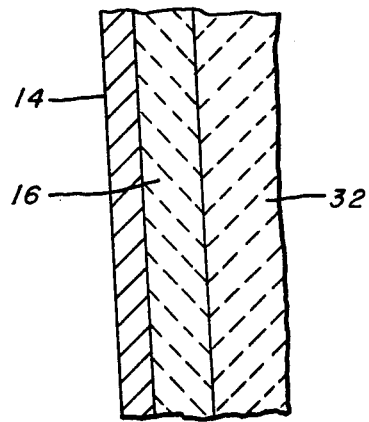

FIG. 2 is an enlarged fragmentary sectional view through the ladle wall and repaired lining in condition ready for use.

The process of the present invention begins with the lowering of a centrifugal impeller 20 into the open upper end of the ladle 10. The upper end of the impeller 20 usually includes a ring 22 for attachment onto the hook of an overhead crane. The impeller 20 also includes rotating means such as a motor 24, with a rotatable shaft 26 having at least two similar branch portions 28 extending preferably in opposite directions of each other. The shaft 26 is a conduit through which the mixture of refractory materials descends from an inlet conduit 30.

As the impeller shaft 26 is rotated the mixture of refractory material enters the arms 28 and is expelled at the outer ends onto the inner surface of the remaining lining 16. A new lining 32 is thereby formed and has a thickness that is dependent upon the speed of rotation of the impeller shaft 26 and the speed of vertical movement of the impeller 20. Although the lining 32 may be applied by moving the impeller 20 vertically in either direction (up or down), the lining is preferably applied by lowering the impeller until the arms 28 are disposed near the bottom wall 12. With the shaft 26 substantially coaxially disposed with regard to the vertical wall 13, the shaft is then rotated, as indicated by the arrow 34, and the impeller is lifted as indicated by the arrow 36, at a speed calculated to apply the lining 32 to the desired thickness. The thickness of the lining 32 usually varies from about one-fourth inch up to 2 inches. Greater thicknesses such as up to 10 inches may also be applied where necessary.

The process of this invention is not limited however, to centrifugal application by a rotating impeller 20. The linings 16 and 18 may be applied by the use of a pneumatic gun, mechanical thrower (belt type), gravity drop, manual trowelling, and spraying slurry mixtures. Generally, all of these methods of application are useful for applying lining 16 to the ladle side wall and the gravity drop is particularly useful for applying the lining 18 to the bottom wall 12. Moreover, where means other than a centrifugal impeller are used, such as pneumatic gunning, the ladle may be in other positions such as an at side or even upside down.

The temperature of the ladle 10 including the remaining lining 16, the lining 18 as well as the outer walls 12 and 14 may vary from as low as 250°F up to about 3,000°F. during application of the lining 32. The lower temperature is the melting point of most organic binders used in the refractory mixture. The upper temperature (3,000°F) may be the ladle temperature just after a previous heat of metal is poured.

The refractory mixture is initially applied for forming the lining 32 contains basic constituents including organic binders, sodium silicate, clay, and quartzite. The percentages indicated are by weight. The organic binders may include such materials as pitch, tar, rosins, polyvinylchlorides, and polyethyltetrachloride. Such binders have melting points of from about 250° to 400°F. The particle size of the binders is preferably less than one-fourth inch. The organic binders are present in useful amounts varying from about ½% to 4% of the total dry mixture. A preferred range of the binder is from about 1.5% to about 2.5% and an optimum amount being about 2%. Below ½% the binder is nonfunctional; i.e., there is not enough to operate as an adherent and satisfactory binder. Above 4% the binder and particularly pitch results in the evolution of massive amounts of fumes and is highly susceptible to oxidation. The purpose of the organic binders is to replace most of the water present in prior existing mixtures which were applied to cold surfaces after a ladle had been cooled to, say 100°F. By eliminating all or substantially all, of the water content of the mixture, the explosions, resulting from steam created when molten steel contacts the newly applied refractory, are avoided. The organic binders, however, are provided in an amount less than 4% of the total mixture which melts upon impingement on the hot surface of the ladle and therefore forms a tacky surface for holding subsequently applied materials impinging in the same area. The heat causes binders to carbonize and leaves a mosaic structure of crystalline carbon intermixed with the other constituents of the lining which, when applied in particle form, provide a mechanical structure which is bonded between the old lining 16 and the new lining 32.

Sodium silicate is present in useful amounts varying from about ½% to about 4%, with a preferred range of from about 1.5% to about 2.5% and an optimum amount of about 2%. Sodium silicate is present to form a highly viscous liquid that, upon solidification, forms a glass-like or vitrified barrier to oxidation reactions between the carbon in the lining and the dissolved oxygen in the molten steel and slag that contact the ladle lining during use, sodium silicate vitrifies after steel is poured into the ladle. If sodium silicate is present in amounts greater than 4% a glass of a much lower fusion temperature occurs and is not as protective as amounts of less than 4%, but sodium silicate in amounts of less than ½% is not effective as an oxidation preventer. Moreover, silicates of other alkali metals such as potassium silicate may be used as substitutes for or mixtures with sodium silicate.

Clay is present in useful amounts varying from 20% to 80% of the total dry mixture. The preferred range of clay is from about 45% to about 70% and the optimum amount is about 60%. The preferred clay materials are alumina and silica compounds. The clay compounds, especially bond clays, have wet strength as initially applied and the clay compacts itself in place to hold the entire mixture until all of the organic binders melt and carbonize to form the mosaic of crystalline carbon which provides the basic strength of the new lining 32.

Quartzite is present in useful amounts varying from 12% to 72% of the dry mixture. The preferred range of quartzite is from about 25% to about 50%, and an optimum amount is about 36%. Typical quartzite compounds include 98% of silica ($SiO_2$) with about 0.5% of alumina ($Al_2O_3$). The quartzite acts as a filler.

Water may be added to the mixture of the organic binders, sodium silicate, clay, and quartzite either by premixing or during application of the mixture. The amount of water may vary from about 4% to 6% of the total dry mixture. It is noted that clay compounds ordinarily contain about 4% water in various forms, such as water of hydration and crystallization, which when supplemented by the addition of from 4% to 6% of water, totals approximately 10% water for the entire mixture. Higher amounts of water often cause steam explosions. Water is primarily useful where the mixture is applied to side or vertical walls where the water acts as a temporary binder for holding the mixture particles in place, until the organic binder melts and binds the particles of sodium silicate, clay, and quartzite in place; thus the water prevents the particles from dropping from their place on the vertical side walls. However, where the mixture is applied to the ladle bottom wall there is no possiblity of the mixture particles dropping out of place. For that reason water is not necessary to serve as a temporary binder; the mixtures applied to horizontal surfaces such as as ladle or furnace bottom walls remain in place for the short time that the organic binders melt and act to hold the mass together.

As the mixture leaves the impeller or other applicator, the latent heat of the ladle causes much of the water to evaporate before it impinges upon the ladle wall. Sufficient water is retained, however, to cause the clay to function as a bonding agent until the lining composition is completely formed.

When the mixture of refractory composition first strikes the hot surface of the ladle lining 16, the heat in the lining immediately causes the organic binders, such as pitch, to melt and form a sticky or tacky surface to which subsequently applied particles adhere. However, after a buildup of the lining 32, the initial lining serves as a heat insulator. At that time the wet clay, having the property of plasticity, serves as the primary bonding agent for a buildup of particles of the mixture which thereafter accumulate to the desired thickness.

Ultimately, however, the latent heat in the ladle lining 16 overcomes the insulating effect of the initial organic binder layer and causes more and more of the subsequently applied organic binder particle to melt. At the same time the water is evaporated and driven out of the new lining 32. As the effect of the heat continues to work on the lining 32, the water is evaporated and the organic binders continue to melt outwardly. Before the mixture strikes the ladle surface the water (whether added water or only water of hydration and crystallization) dissolves the sodium silicate. After striking the ladle surface, the water boils off and the sodium silicate hardens. Meanwhile, the first applied portions of organic binders carbonize and form a mosaic structure of crystalline carbon intermixed with the alumina and silica particles in the quartzite and clay. The resulting structure includes a continuous phase of mosaic carbon and the clay containing the spaced particles of silica of the quartzite which is the discontinuous phase.

The purpose of the sodium silicate is to form a highly viscous glass near the interface adjacent the molten metal. The sodium silicate coats the carbon particles and prevents oxidation at temperatures lower than fusion, thereby inhibiting the transfer of oxygen from molten metal into the applied layer and avoiding oxidation of the carbon in the lining. Thus, sodium silicate, though used in small amounts compared to conventional mixtures used for cold application of refractory, increases the mechanical strength of the applied lining at low and intermediate temperatures. This mechanical effect is valuable in high impact or mechanical erosion areas of the ladle; i.e., where the tapping stream from a converter or furnace impinge on the bottom or side walls.

During the formation of the ultimate structure of the lining 32, the lining undergoes a color change which indicates to an observer when the final structure of the lining 32 is completely formed. When the refractory composition is initially applied, it has a light gray appearance. When all of the water including water of hydration and crystallization is evaporated, the appearance changes to a dark gray color which signals water has been evaporated. Subsequently, when the organic binders carbonize, the color of the lining again changes to a light beige appearance which is indicative of the complete formation of the lining 32. Those color changes occur very rapidly, on the order of about 10 to 15 minutes, depending upon the thickness and temperature of the ladle when the lining is applied.

By the proper selection of the components to be combined the refractory composition is prepared and adhered to hot surfaces immediately without relying upon the mass cooling effect of water and material as was the case with conventional refractory materials. The range of recommended compositions is extensive and embraces basic, acid, and neutral refractory materials which combine the bonding effect of clay together with that of the organic binders; namely, hydrocarbon-sodium silicate, hydrocarbon-phosphate, hydrocarbon-chromic acid, hydrocarbon-clay, hydrocarbon-silica, hydrocarbon-alumina and the lime. A synthesis of all of those bonds is fundamental to the adherence of the refractory composition as it is applied.

Although the thickness of the lining 32 applied may vary from one-fourth inch to 10 inches or more, it has been found that the usual thickness to be applied is from about one-fourth inch to 1½ inches per application. A lining having a thickness varying from about one-fourth inch to 1½ inches is useful for at least two heats before relining is required. An iron ladle operating normally between 2,300° and 2,600°F may receive smaller quantities and lesser thicknesses of lining than steel ladles operating at from 2,750° to 2,900°F. Moreover, steel operations producing predominantly low carbon rimmed grades shown normal ladle lining erosion of about one-fourth inch per heat. Therefore, a lining thickness of one-half inch per application using the process of this invention give a minimum of two heats service before another application of the lining is required. Initial results indicate that three or four heats from a ½ inch thick lining are possible.

For a comparison of the time required to replace a lining by the process of this invention with the processes well known in the art including (1) conventional brick and mortar linings, (2) cold ladle gunning, and (3) cold slingered ladle lining, reference is made to Table I as follows:

TABLE I

Time for Replacing Ladle Linings

|  | Hot Ladle Method | Brick & Mortar Method | Cold Slinger Method | Cold Gun Method |
|---|---|---|---|---|
| Cooling & Preparation | 0 | 6+ hrs. | 6+ hrs. | 0 |
| Reline Per Ladle | 10 min. | 8+ hrs. | 4+ hrs. | 8 hrs. |
| Reline Per Heat | 5 " | 24 min. | 10 min. | 1.6 – 2 hrs. |
| Drying Per Ladle | 15 " | 15 hrs. | 15 hrs. | 15 hrs. |
| Drying Per Heat | 7.5 " | 45 min. | 45 min. | 3.0 – 3.75 hrs. |
| Total Delay Per Heat | 12.5 " | 1 hr., 27 min. | 1 hr., 15 min. | 4.6 – 5.75 hrs. |

It is deemed readily apparent that the process of this invention provides a replacement lining for a hot ladle in a period of time (12.5 minutes per heat) which greatly reduces the time that a ladle is out of service as compared with the times for relining under prior conventional methods. The conventional brick and mortar type of lining requires the use of preburned ladle brick and mortar laid by hand to form a lining inside the ladle. Cold gunning involves shooting a ladle interior with pneumatic equipment to a thickness of approximately 1¼ inch. The latter must be repeated every four or five heats for efficient operation. The cold slingering process of lining ladles involves installation of a refractory handling plant and shop space for installation of slingering machinery. The capital investment is high and the process is costly especially if all brick layers have been removed and the system breaks down.

Heretofore, this invention has been described as a process for applying replacement lining to steel ladles. It is understood, however, that the process may also be used for applying similar linings to the walls of various types of metallurgical vessels, such as soaking pits and furnaces. Because of the differences in temperature of operation of ladles, soaking pits, and furnaces variations in the mixture of the refractory material are involved.

The mixture contains different amounts of components for different applications. The control of refractory properties depends on the desired $Al_2O_3$ content of the mixture, as follows:

| Mixture | $Al_2O_3$ |
|---|---|
| Steel ladle | 8–40% |
| Soaking pit and reheat furnace | 10–12% |
| Iron ladle and cope | 12–25% |

Thus, when the desired $Al_2O_3$ content is provided by a clay containing 20–35% $Al_2O_3$ the mixtures arre made proportionately.

Typically examples of the ranges and preferred compositions of the sodium silicate, organic binder, clay and quartzite involved are set forth in Table II as follows:

TABLE II

| | Composition Range (Weight %) | | | |
|---|---|---|---|---|
| | Sodium Silicate | Organic Binder | Clay | Quartzite |
| Steel ladle | ½–4(2) | ½–4(2) | 20–80(60) | 12–72(36) |
| Soaking pit | ½–4(2) | ½–4(2) | 50–60(55) | 38–48(43) |
| Iron ladle and coping | ½–4(2) | ½–4(2) | 60–70(65) | 28–38(33) |

(Parenthetical figures are preferred percentages)

The use of mixtures of refractory compositions where organic binders replace the dominant portion of water as used in prior conventional refractory compositions satisfies the prior-existing problems of replacing the lining of a furnace, ladle, or soaking pit in a minimum of time so that the equipment is back in service as soon as possible.

The composition and process of the present invention provides positive adherence of the refractory material applied to hot surfaces and provides a color change indication of when the water content is substantially completely dissipated. Thus, the hot is equipment is not cooled unduely and it, therefore, does not require subsequent lengthy heating periods to return it to operating temperatures. Moreover, the problems associated with the conventional three zone lining structure are eliminated by the proper application procedures of this invention.

What is claimed is:

1. A refractory composition suitable for application at temperatures of at least 250°F and being capable of being applied to hot vessels by projection consisting essentially of, by weight, from about ½% to about 4% of at least one of an alkali silicate selected from the group consisting of potassium silicate and sodium silicate, from about ½% to about 4% of organic material, selected from the group consisting of pitch, tar, rosin, polyvinylchloride, polyethyltetrachloride, and mixtures thereof, the organic material having melting points of from about 250° to 400°F, from about 12% to about 72% of quartzite, and from about 20% to about 80% of bonding clay.

2. The mixture of claim 1 wherein there is from about 1.5% to about 2.5% sodium silicate, from about 1.5% to about 2.5% organic material, from about 25% to about 70% quartzite, and from about 20% to about 80% clay.

3. The mixture of claim 1 wherein there is about 2% sodium silicate, about 2% organic material, about 36% quartzite, and about 60% clay.

4. The mixture of claim 1 wherein the mixture contains water in an amount of from about 4% to about 6%.

5. The mixture of claim 4 wherein there is about 2% sodium silicate and potassium silicate, from about 1.5% to about 2.5% organic material, about 12% to about 50% quartzite, and about 20% to about 80% clay.

6. The mixture of claim 4 wherein there is about 1.5% to about 2.5% sodium silicate, about 1.5% to about 2.5% organic material, about 25% to about 50% quartzite, and about 45% to about 70% clay.

7. The mixture of claim 4 wherein there is about 2% sodium silicate, about 2% organic material, about 36% quartzite, and about 60% clay.

8. The mixture of claim 1 wherein there is at least one material of the group consisting of sodium silicate and potassium silicate in an amount of from about 1.5% to about 2.5%.

* * * * *